(12) United States Patent
Vallabhu et al.

(10) Patent No.: US 9,204,378 B2
(45) Date of Patent: Dec. 1, 2015

(54) WIRELESS NETWORK CONNECTIVITY ENHANCEMENTS

(75) Inventors: Venkata Vallabhu, Aloha, OR (US); Raguraman Barathalwar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/992,515

(22) PCT Filed: Feb. 17, 2012

(86) PCT No.: PCT/US2012/025579
§ 371 (c)(1),
(2), (4) Date: Jun. 7, 2013

(87) PCT Pub. No.: WO2013/122598
PCT Pub. Date: Aug. 22, 2013

(65) Prior Publication Data
US 2014/0286190 A1    Sep. 25, 2014

(51) Int. Cl.
*H04L 12/24* (2006.01)
*H04L 12/721* (2013.01)
*H04W 80/04* (2009.01)
*H04W 88/06* (2009.01)
*H04W 28/04* (2009.01)
(Continued)

(52) U.S. Cl.
CPC .......... *H04W 48/16* (2013.01); *H04W 52/0241* (2013.01); *H04W 52/0274* (2013.01); *H04W 76/028* (2013.01); *H04W 84/12* (2013.01)

(58) Field of Classification Search
CPC ....... H04L 41/12; H04L 45/02; H04W 80/04; H04W 88/06; H04W 28/04; H04W 72/04
USPC .......................................... 370/254, 328, 329
See application file for complete search history.

(56) References Cited

U.S. PATENT DOCUMENTS

| 2006/0282554 A1 | 12/2006 | Jiang et al. |
| 2009/0270091 A1 | 10/2009 | Joshi et al. |
| 2011/0075598 A1 | 3/2011 | Jalfon et al. |

FOREIGN PATENT DOCUMENTS

WO   WO-2013122598 A1   8/2013

OTHER PUBLICATIONS

International Application Serial No. PCT/US2012/025579, International Preliminary Report on Patentability mailed Aug. 28, 2014, 6 pgs.
International Application Serial No. PCT/US2012/025579, Search Report mailed Oct. 19, 2012, 3 pgs.
(Continued)

*Primary Examiner* — Ronald B Abelson
(74) *Attorney, Agent, or Firm* — Schwegman Lundberg & Woessner, P.A.

(57) ABSTRACT

Devices and configurations to implement wireless network connectivity enhancements that improve wireless network connection time and operations are generally disclosed herein. In some embodiments, a reduced wireless network scan is performed to only scan wireless network channels associated with a preferred or previously profiled wireless network. If a preferred or profiled network is identified from the result of the reduced wireless network scan, then an automatic connection may be established immediately with the preferred or profiled wireless network. Performance of the reduced wireless network scan may be performed instead of a full wireless network scan, thereby saving the amount of time required to scan channels that do not have a preferred or profiled wireless network.

22 Claims, 7 Drawing Sheets

(51) Int. Cl.
*H04W 72/04* (2009.01)
*H04W 48/16* (2009.01)
*H04W 52/02* (2009.01)
*H04W 76/02* (2009.01)
*H04W 84/12* (2009.01)

(56) References Cited

OTHER PUBLICATIONS

International Application Serial No. PCT/US2012/025579, Written Opinion mailed Oct. 19, 2012, 4 pgs.

WIRELESS NETWORK CONNECTIVITY ENHANCEMENTS

PRIORITY APPLICATION

This application is a U.S. National Stage Application under 35 U.S.C. 371 from International Application No.PCT/US2012/025579, filed Feb. 17, 2012, which is hereby incorporated by reference in its entirety.

TECHNICAL FIELD

Embodiments pertain to the use of wireless communications in computing systems and devices. Some embodiments relate to the establishment of wireless network connections in a computing system or device.

BACKGROUND

Many computing systems and devices provide connectivity to wireless networks. One wireless network communication standard commonly implemented in computing systems and devices is known as Wireless Fidelity (Wi-Fi), which generally refers to a wireless local area network (WLAN) operating according to a standard from the IEEE 802.11 standards family.

When a computing system is maintained in standby mode, a new connection will need be established with a new Wi-Fi network when the computing system resumes from standby and the previously connected Wi-Fi network is no longer available. Although a computing system resuming from standby is otherwise instantly on, establishing the new connection can be very time consuming and can delay operations of the computer system. Thus, configurations and techniques are needed for connection reestablishment that operate quicker than conventional devices and techniques.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein provide for enhanced methods of wireless network connection scanning and establishment. For example, in some embodiments, a scanning technique is provided that is capable of significantly reducing the scanning time and network selection time involved in establishing or re-establishing a connection to a wireless access point of a wireless network. These techniques may be used in a computing system to reduce the overall wireless network connection time, and establish an "instant" or "near-instant" wireless network connection. Additionally, these techniques may be used to avoid unnecessary network scanning activity, and may even provide power-saving measures.

In some embodiments, reducing wireless network connection establishment time is performed using network scanning optimizations. One example network scanning optimization technique includes maintaining a listing of wireless network channels for one or more preferred wireless networks. When a wireless network scan needs to be performed, only wireless network channels provided by the listing of the wireless network channels is scanned. If no preferred wireless networks are identified from the scanned channels, the remainder of the other possible wireless network channels may be scanned. Therefore, in scenarios where the wireless network adapter is in range of a preferred network, only a subset of the channels will be scanned, skipping scanning of channels where no preferred network exists.

As used herein, a "preferred" wireless network is a wireless network connection that has been profiled, or otherwise previously indicated in a computing system for re-connection at a later time. For example, the Windows operating system provides the ability to save wireless network information for a set of one or more preferred networks for automatic reconnection. The Windows operating system further provides the ability to indicate a priority of connection (e.g., create a rank) among the preferred networks. Other software executed in the operating system such as wireless network adapter software or connection management utilities may also provide the ability to establish a list of preferred networks and automatically reestablish wireless network connections to a preferred network based on user rules, configurations, or other determined criteria. Therefore, while a preferred network may not be the user-selected network at the time of connection, a preferred network is automatically selected for connection based on managed connectivity information and is assumed as preferred for connection over a non-preferred network that has no managed connectivity information.

The time used to establish a wireless network connection in a computing system with a preferred or non-preferred network is dependent on a number of variable factors. In most scenarios with existing techniques, however, the largest amount of time is spent in the scanning phase, where each communication channel capable of providing a wireless network is scanned to determine potential access points or base stations to connect to.

A typical Wi-Fi connection flow when resuming from a standby state in a new location involves following steps: 1) Scan for networks in all the supported Wi-Fi bands (e.g., 2.4 GHz and/or 5 GHz bands); 2) Select a network matching one of the automatic-connect profiles; 3) Start association with the selected wireless network; 4) Complete authentication after association; 5) Obtain an IP Address; and 6) Identify the network in the computing system for internet connectivity.

The total amount of time it takes for a computing system to establish a connection with a new wireless network is therefore often dependent on the amount of time required to perform a scan of available networks. In many computing systems, it may take at least seven seconds to complete a full wireless network scanning of common Wi-Fi channels. Additionally, the selection step may consume additional time to select the right network depending on the number of auto-connect profiles in the system and number of available networks in the environment.

Even in scenarios where a listing of preferred networks is maintained, the universe of possible networks is first compiled before initiating connection to an identified preferred network. Thus, in a Wi-Fi connection setting, a wireless network adapter will conduct a scan of every channel that could possibly contain a wireless network to determine a list of available wireless networks, which is then narrowed to a list of preferred wireless networks, from which a most preferred wireless network will be selected for connectivity.

Some computing systems are configured to re-establish a connection to the last known wireless network without performing a network scan. This decreases the re-connection time for a computing system that remains at a single location with a fixed access point, if the last known wireless network remains available for connection. If the computing system is moved to another location, however, the last known wireless network may not be available. This is especially evident in settings where the computing system is placed into a standby or hibernation mode while connected to the last known wireless network, and is moved to an area having another preferred network before resuming power. In this setting, the previously connected network is no longer available, and the listing of available networks obtained prior to standby or hibernation will be outdated. Using existing techniques, the computing system will need to perform a complete network scan of all wireless network channels, even if a preferred network (or even if only one preferred network) is available at the new location.

Figure 1:
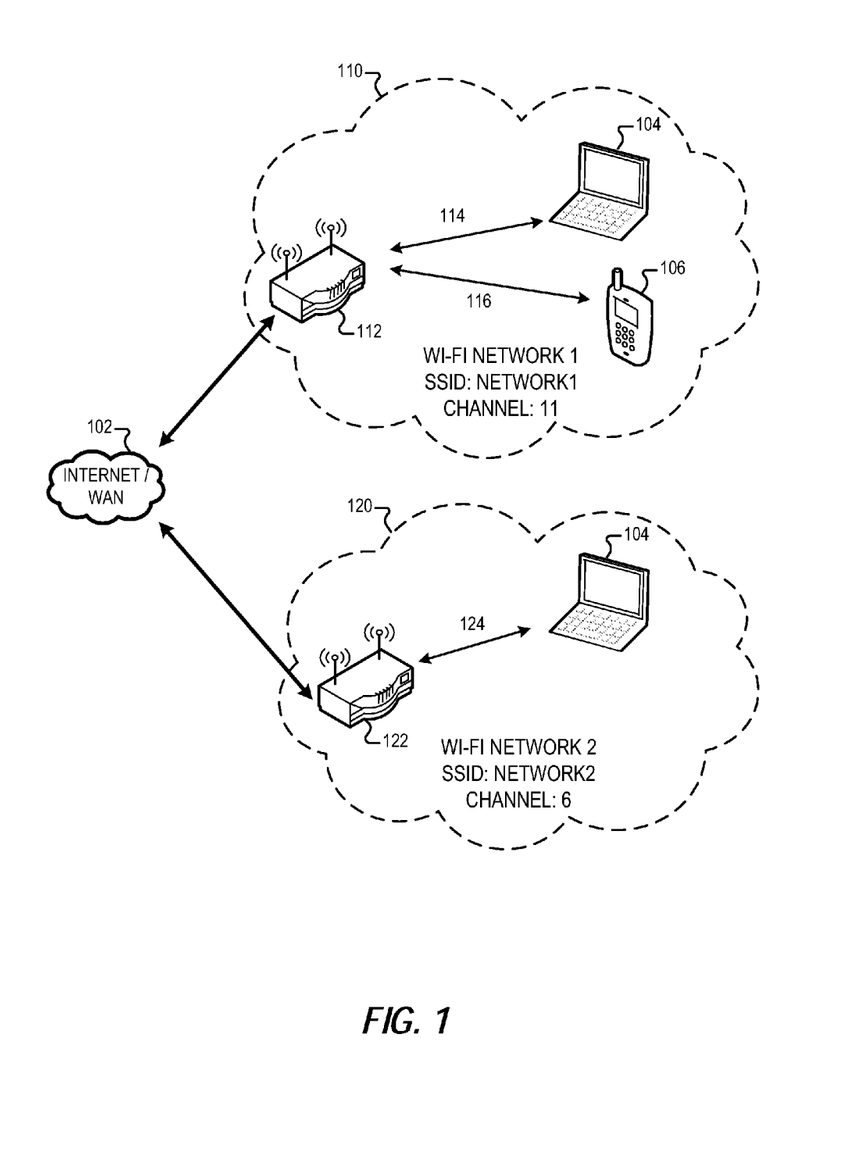
FIG. 1 illustrates an example configuration of wireless networks according to some embodiments.

FIG. 1 provides an illustration of an example configuration of wireless networks provided in connection with some embodiments. As illustrated, a series of access points 112, 122 provide a connection to the Internet or another wide area network 102. Each of the access points 112, 122 are used to establish WLANs for one or more connecting devices.

As illustrated, the access point 112 provides a Wi-Fi compliant first wireless network 110 denoted as "WI-FI NETWORK 1", having service set identification (SSID) "NETWORK1", and being broadcast on channel 11.

Within the first wireless network 110, a series of devices such as a portable computing device 104 and a smartphone mobile device 106 establish wireless network connections to the access point 112 via connections 114 and 116 respectively. As also illustrated, an access point 122 provides a Wi-Fi compliant second wireless network 120 denoted as "WI-FI NETWORK 2", having SSID "NETWORK2", and being broadcast on channel 6.

When the computing device 104 is placed in standby or another power-conservation mode, and is moved from a location where network connectivity is provided by the first wireless network 110 to a location where network connectivity is provided by the second wireless network 120, the computing device 104 will first attempt to connect to the first wireless network 110 when power is restored to the computing device 104. The computing device 104 will immediately recognize that the first wireless network 110 is not available at this location, and will initiate a connection establishment sequence to both discover available networks, and connect to preferred wireless networks.

In some embodiments described herein, when the computing device 104 is unable to re-connect to a previously connected network (the first wireless network 110), the computing device 104 will conduct a reduced network scan to locate a preferred wireless network for connection. The computing device 104 may obtain channel information from a listing of preferred networks before beginning a scan of available networks. Such channel information will be used to determine which channels to scan (and thus, which channels to skip) when performing a reduced network scan. Therefore, in the example where the computing device 104 maintains a listing of preferred networks including the first wireless network 110 ("NETWORK1") and the second wireless network 120 ("NETWORK2"), the computing device will perform a reduced network scan of channels 6 and 11, rather than performing a full network scan of all 11 2.4 GHz Wi-Fi channels. Upon identifying the second wireless network 120 after a scan of channels 6 and 11, a network connection 124 may be established between the computing device 104 and the access point 122.

In a further embodiment, when moving from a location of a first wireless network to another location, the channel for the first wireless network may not be initially scanned. In the scenario where the computing device 104 is moved from the proximity of the first wireless network 110 to another location (e.g., to the proximity of the second wireless network 120), there is no need to re-scan Channel 11 unless another preferred network is potentially available on this channel. Thus, when it is known that the only preferred network on a particular channel is not available for reconnection, the reduced scanning technique will not scan this channel.

Figure 2:
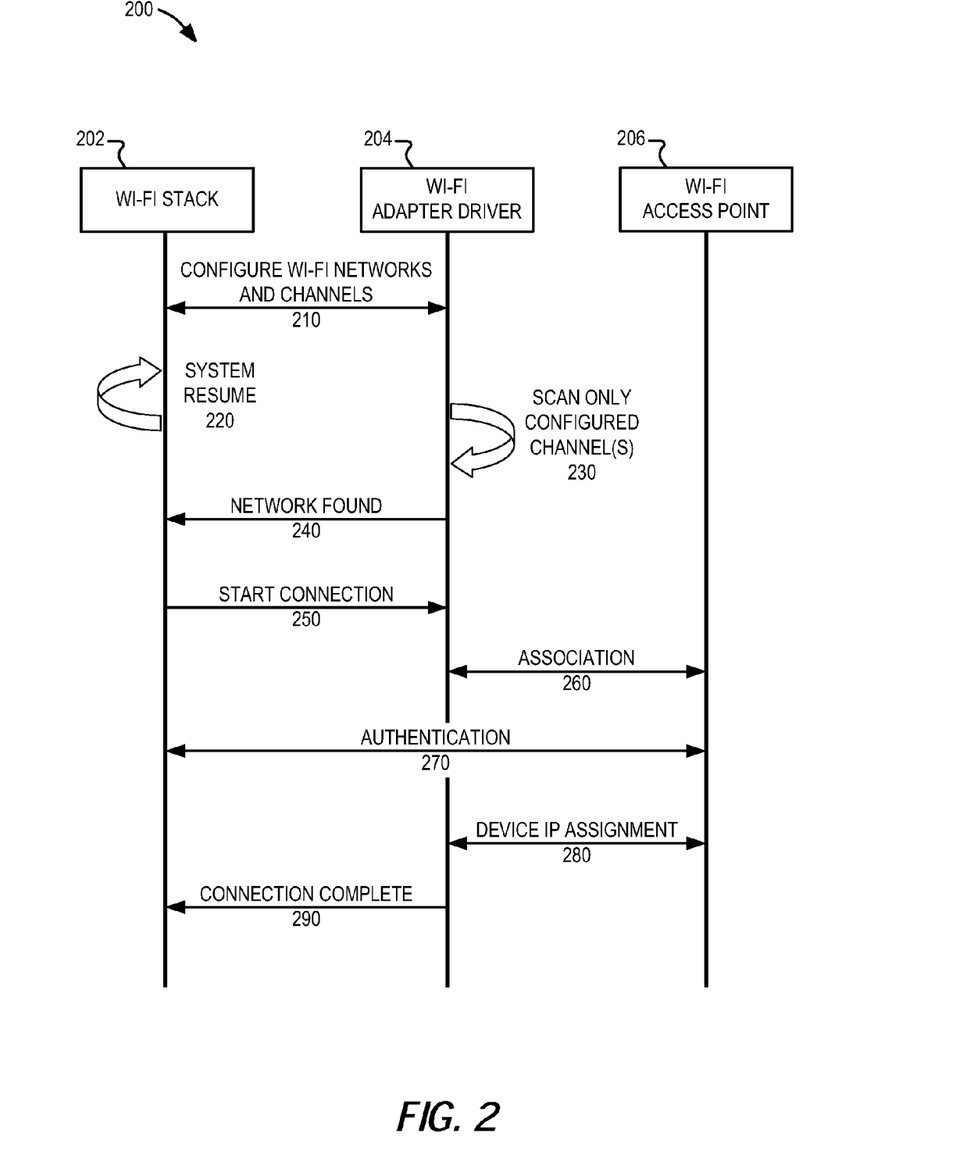
FIG. 2 illustrates example operations performed for wireless network connection establishment according to some embodiments.

FIG. 2 provides an illustration of example operations 200 performed for a wireless network connection establishment in some embodiments, depicted as a flow between a series of computing system components: Wi-Fi Stack 202, Wi-Fi Adapter Driver 204, and Wi-Fi Access Point 206. The operations 210-290 are more specifically illustrated as a sequence occurring over a period of time, although it will be understood that additional or substitute operations may be performed for wireless network connection establishment.

Initially, Wi-Fi networks and channels may be configured within the computing system (operation 210) using information exchanged between the Wi-Fi Stack 202 and Wi-Fi Adapter Driver 204. For example, a listing of preferred networks may be established in conjunction with user input or saved connection information. The Wi-Fi Stack 202 may also maintain the history of the broadcast channels for preferred, profiled, or other auto-connect network connections. Channel information may be collected and updated over a period of time based on the connections made by the Wi-Fi Stack 202 to various preferred networks in various channels.

Before the computing system goes to sleep, hibernates, enters a powered-down mode, or disables or powers off the wireless adapter, the networks and their associated channel information will be saved or otherwise persisted. Then, when a system or the wireless adapter resumes from a powered-down or standby mode (operation 220), the Wi-Fi Adapter Driver 204 can be instructed to perform scanning in only the preconfigured channels (operation 230) associated with preferred or auto-connect network connections. Likewise, the Wi-Fi Adapter Driver 204 can be instructed to refrain from scanning wireless channels that are not known to provide a preferred wireless network.

When the Wi-Fi Adapter Driver 204 locates a network (the Wi-Fi Access Point 206) with the reduced scan operation, a notification may be provided to higher layer software such as the Wi-Fi Stack 202 that a network is found (operation 240). The higher layer software, such as the Wi-Fi Stack 202, may initiate a quick connection to the found network (operation 250) with a command to the Wi-Fi Adapter Driver 204. Connection establishment operations such as association (operation 260), authentication (operation 270), and device IP assignment (operation 280) may be performed with interactions among the Wi-Fi Stack 202, the Wi-Fi Adapter Driver 204, and the Wi-Fi Access Point 206. Finally, upon completion of the connection establishment (operation 290), the new wireless network connection may be identified in the computing system as available for network connectivity (e.g., with an indication to the operating system or other software).

Figure 3:
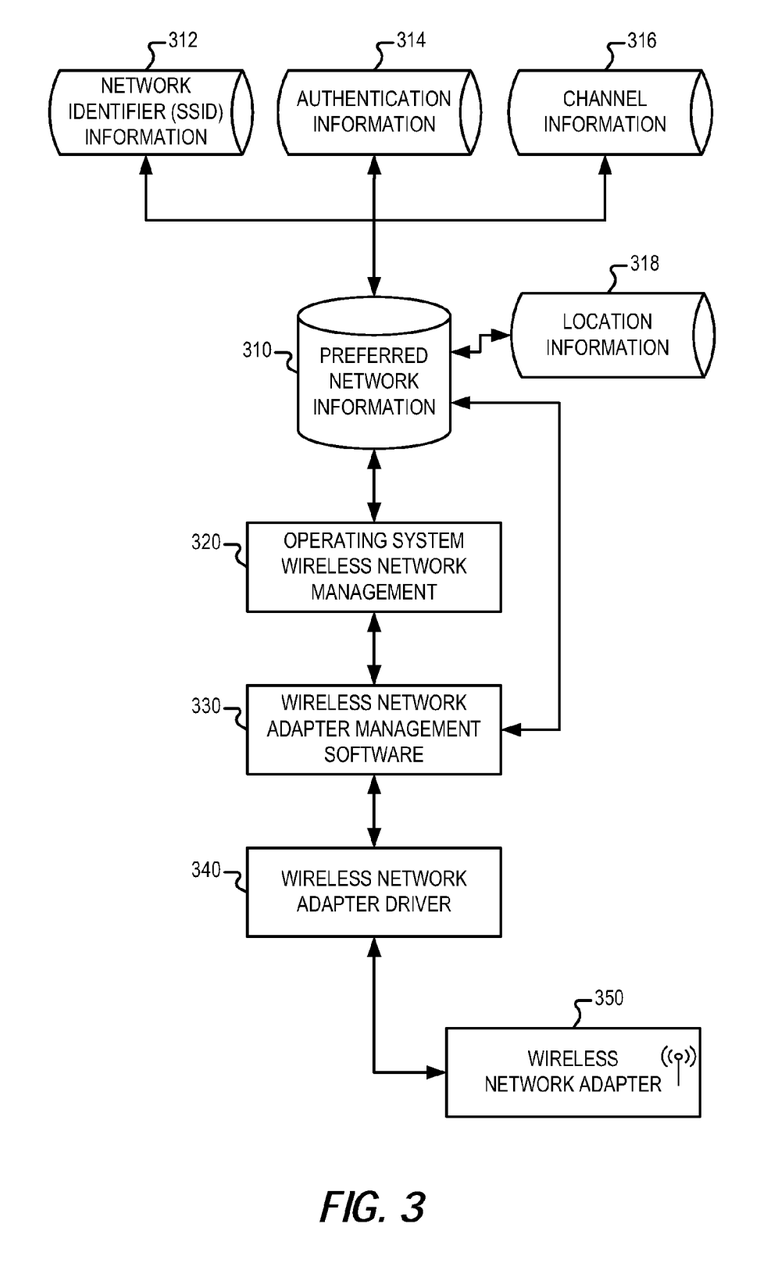
FIG. 3 illustrates an example data flow for wireless network information used in wireless network connection establishment according to some embodiments.

FIG. 3 illustrates an example data flow of wireless network information between components used in wireless network connection establishment in connection with some embodiments. As illustrated, Preferred Network Information 310 is maintained and collected, for example by a Wi-Fi stack or other wireless network adapter management software in a computing system. The data stored by the Preferred Network Information 310 may include, but is not limited to, the Network Identifier Information 312; the Authentication Information 314; and the Channel Information 316. In some embodiments, the data stored by the Preferred Network Information 310 also includes the Location Information 318.

For example, in a computing system, the Preferred Network Information 310 may be maintained in a series of "profiles", with a profile associated with each location or preferred wireless network. The profile may be used for automatically establishing a wireless network connection when saved, for example, through the use of saved Authentication Information 314 accompanied with a preference indication for a particular wireless network associated with certain Network Identifier Information 312.

The Network Identifier Information 312 may be used to maintain a listing of preferred networks by SSID, or other wireless network identifier. The Authentication Information 314 may be used to maintain authentication information of preferred networks, with information such as authentication type (e.g., open, WEP, WPA, WPA2, or other authentication type), pre-shared key value, or other relevant data values used in authentication operations with a wireless network.

The Channel Information 316 may be used to store basic information on which channel or channels that a wireless network is associated with or is broadcasting on. For example, an 802.11(b), 802.11(g), or 2.4 GHz 802.11(n) Wi-Fi network may have a channel selected from 11-14 consecutively numbered channels (where a "channel" corresponds to a specific channel center frequency, e.g., 2.437 GHz for Channel 6). As another example, an 802.11(a) or an 802.11(n) 5 GHz Wi-Fi network may have a channel selected from 21 non-consecutively numbered channels. As connections are established with preferred or profiled networks, the channel information in Channel Information 316 is collected and updated. For example, in some embodiments, the Channel Information 316 is collected and updated only for successful connections to preferred networks.

The Location Information 318 may be maintained in some embodiments to associate certain location attributes or data with one or more wireless networks. For example, a SSID may be associated with a certain Global Positioning System (GPS) coordinate or a range of coordinates. Therefore, when the computing system determines that it is located at a certain location, then certain Preferred Network Information 310 for that location may be accessed. Additionally, the Location Information 318 may also be used to determine connection preferences if multiple preferred networks are available for connection.

Although the information stored by the Preferred Network Information 310 is depicted as residing in separate stores, it will be apparent that the information may be consolidated into one or more databases. For example, a single database table may be provided to link the Network Identifier Information 312, the Authentication Information 314, and the Channel Information 316 for each wireless network. Likewise, a variety of databases or other data stores may be used to maintain the Preferred Network Information 310. For example, the data for the Preferred Network Information 310 may be provided in an operating system registry; in a flat file; in a software or driver application settings file; or in another persistent store accessible to management or operational software of the operating system or the wireless network adapter.

FIG. 3 further depicts data flow of the Preferred Network Information 310 with either or both of the Operating System Wireless Network Management 320 and the Wireless Network Adapter Management Software 330. For example, establishment of the wireless network connection and various scanning, connectivity, and authentication operation may be performed by either or a combination of the Operating System Wireless Network Management 320 and the Wireless Network Adapter Management Software 330. Thus, either or both of these components may be responsible for using the Preferred Network Information 310 to perform a reduced network scan of preferred network channels.

The Wireless Network Adapter Management Software 330 (or alternatively, the Operating System Wireless Network Management 320) is then configured to provide commands to a Wireless Network Adapter Driver 340 to perform the reduced network scan. For example, commands provided to the Wireless Network Adapter Driver 340 may provide an instruction to only perform scanning of specified channels. The Wireless Network Adapter Driver 340 may be configured to provide commands and software-driven control of the Wireless Network Adapter 350.

Most of Wi-Fi network configurations that users connect to provide only one access point, broadcasting on only one fixed channel. In some enterprise networks, however, more than one access point may operate in various channels. Thus, a preferred network in a computing system may be associated with multiple channels. The Channel Information 316 may be configured to associate a preferred network with more than one channel, or in some configurations, certain channels with certain locations.

In many scenarios, access points from multiple preferred networks will reside on common channels (particularly for 2.4 GHz Wi-Fi networks, on channels 1, 6, and 11). Various techniques may be used to limit the number of channels that are scanned, to prevent the reduced network scan from scanning a large number of channels. An "aging" or like expiration technique may be used to reduce the number of channels of preferred networks to scan as time elapses. As one example, channels in which a preferred network has not connected with for a period of time (e.g., 30 days, 90 days, 180 days) may be removed from the list of channels to scan in a reduced network scan. The time, duration, location, or connection characteristics of wireless network connections may also be factored when determining or shortening the list of channels to scan in the reduced network scan.

Figure 4:
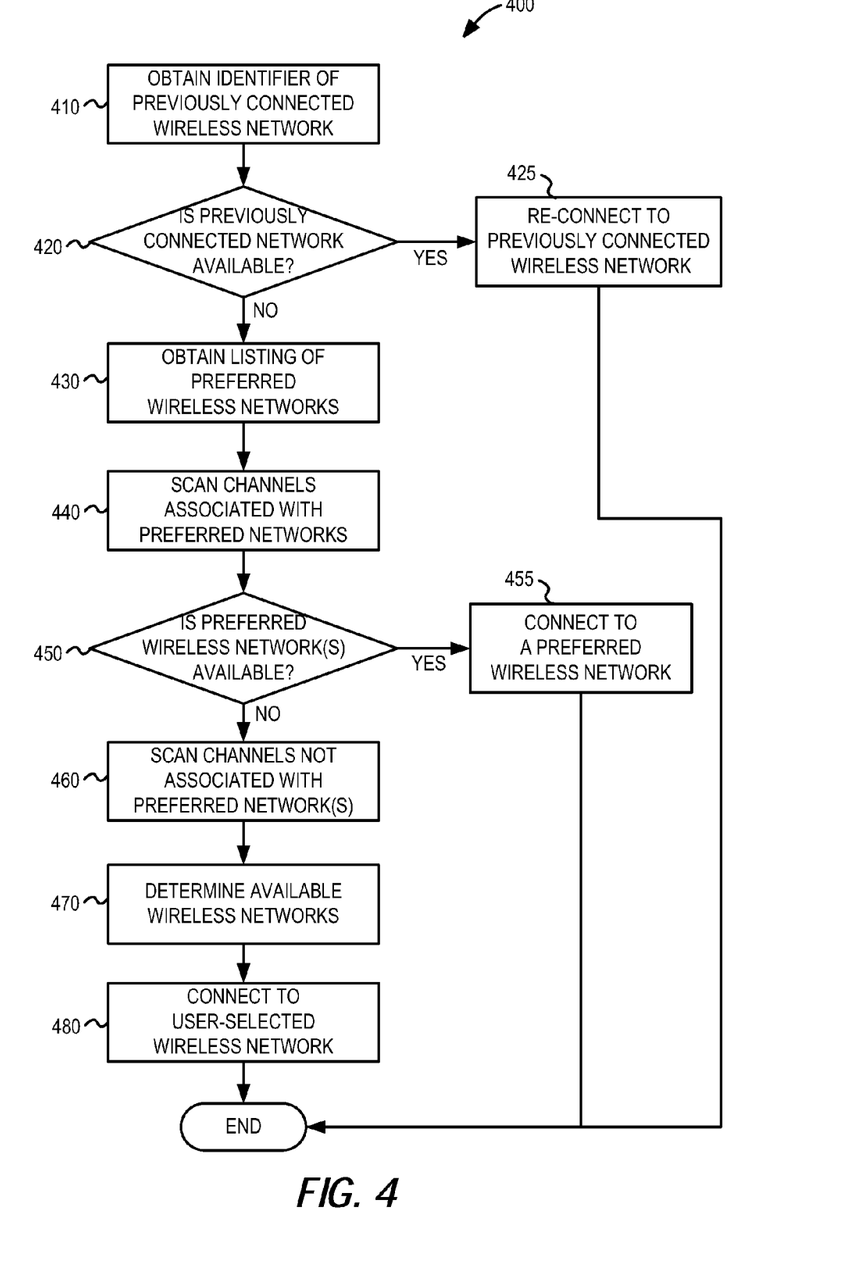
FIG. 4 illustrates an example method for establishing a wireless network connection using a full or reduced network scan according to some embodiments.

FIG. 4 illustrates an example method 400 for establishing a wireless network connection in a computing system using a full or reduced network scan according to some embodiments. As shown, the method begins by obtaining an identifier or other connection information of a previously connected wireless network (operation 410). Next, a check is performed (e.g., by the operating system, or wireless network adapter management tool) to determine whether the previously connected wireless network is available (decision 420). If the previously connected wireless network is determined as presently available, then the computing system can proceed with re-connecting to the previously connected wireless network (operation 425).

In the case where the previously connected wireless network is determined as unavailable (decision 420), then the following operations may be performed to locate a wireless network. These operations include obtaining a listing of preferred wireless networks (operation 430). For example, a data store provided by an operating system or maintained by wireless adapter management software may provide this listing. This listing may include channel information or other radio broadcast attributes for the preferred networks, indicating the channel, frequency, or other location of the wireless spectrum to scan or otherwise search for preferred wireless networks.

Upon determination of the channel information or the other radio broadcast attributes for the preferred networks, a scan is performed of channels associated with the preferred networks (operation 440). For example, if the operating system maintains a preferred network listing for Wi-Fi access point hotspots located at channels 1, 1, and 6, respectively, the wireless network scan will be performed exclusively on channels 1 and 6 (and skip channels 2-5, 7-11, and any other channels or frequencies).

As a result of the wireless network scan on the preferred network channels, a determination is made whether one of the preferred wireless networks is available (decision 450). If one of the preferred wireless networks is determined as presently available, then the computing system can proceed with connecting to a preferred wireless network (operation 455). In the case that multiple preferred wireless networks are detected, then the operating system, wireless adapter management software, or other software module may select one of the preferred wireless networks based on a prioritized list or an evaluation of determined criterion.

If a determination is made that none of the preferred wireless networks is available (decision 450), then a scan of remaining channels may be performed to complete a full network scan. This includes performing a scan of remaining channels not associated with the preferred networks (operation 460). As a result of the full network scan, available wireless networks are determined (operation 470). Finally, the computing system may connect to a user-selected wireless network (operation 480) determined from the full network scan, which may be selected as a result of manual user input or selection, or as a result of user-specified criterion.

Figure 5:
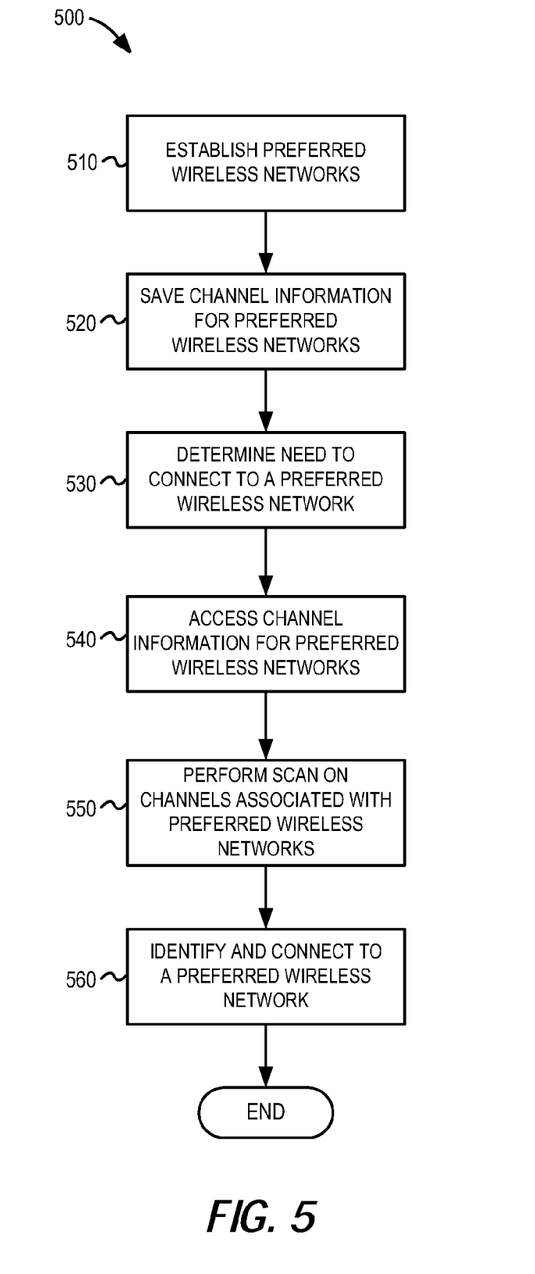
FIG. 5 illustrates an example method for establishing a wireless network connection using a reduced network scan according to some embodiments.

FIG. 5 illustrates an example method 500 for establishing a wireless network connection using a reduced network scan according to some embodiments. As shown, the method begins by establishing preferred wireless networks (operation 510) in a computing system. Channel information for these preferred wireless networks is then saved (operation 520), for example, by an operating system or wireless network adapter management software in association with other information of the preferred wireless networks.

In settings such as the unavailability of a previously connected wireless network, or the relocation of the computing device to another location, a determination is made to connect to a preferred wireless network (operation 530). Channel information for the preferred wireless networks is accessed (operation 540) and is used as an input for performing a reduced network scan of channels only associated with preferred wireless networks (operation 550).

From the results of the reduced wireless network scan, the computing system may identify a preferred wireless network, and ultimately connect to the preferred wireless network (operation 560). In some embodiments, as soon as a network is found in one of the configured channels, the reduced wireless network scan can be stopped, and a connection can be established with the located wireless network without proceeding with additional scanning operations. Further, in some embodiments, if multiple preferred wireless networks are identified from the reduced wireless network scan on a single channel or on multiple channels, then various rules or preferences (from the operating system, or the wireless network adapter management software, for example) may be applied to select a "most" preferred wireless network from a listing of multiple available preferred wireless networks.

Although the reduced network scan activities were described with reference to channel information, the channel information may also be accompanied by a variety of location-based information. The location-based information may be used to determine whether a new network connection is necessary, or whether certain preferred networks should be included or excluded from connection or from input to the reduced network scan. In many existing systems, every time the computing system resumes from a standby or powered-down state, a new location is assumed. Using location-aware techniques may be useful, for example, when determining when to perform a reduced network scan, or determining that a full network scan is necessary because no preferred networks are associated with the location.

Location-based information may be obtained through any number of techniques such as GPS data provided by a computing system GPS sensor, "soft" GPS information based on a connected access point, location information based on network address determination (such as IP address lookups), and other existing location determination techniques.

Other techniques may be implemented in conjunction with the presently described reduced network scan techniques to improve power consumption and multi-band wireless network connectivity. If a list of preferred networks indicates that no preferred networks are located on a particular band or using a particular protocol, then power-consuming activities for that band or protocol may be disabled. For example, if only a preferred network listing of 2.4GHz 802.11(g) networks is provided, then activities to scan for 5GHz 802.11(a) or 802.11(n) networks are unnecessary, and any components consuming power to communicate or attempt connections at the 5GHz band may be temporarily powered-down.

The reduced network scan techniques may also be incorporated into use with other connection enhancements, such as instant-on and "smart connect" techniques. For example, a "smart connect"-enabled computing system that is configured to update content from a wireless network while in a sleep mode may use the presently described reduced network scan techniques to switch among preferred networks. This provides significant benefits when the computing system is moved to another wireless network location while in the sleep mode, because the computing system does not need to perform an unnecessary full network scan to connect to a preferred network. Likewise, the reduced network scan techniques may be used when resuming power or operational control of a wireless adapter, for example in devices and systems that have a "Wireless On/Off" control that the user can toggle to disable or enable operations of the wireless network adapter.

In accordance with the examples provided herein, implementation of the reduced network scan techniques may be provided using a combination of operating system, wireless network adapter management software, and wireless network adapter driver modifications. For example, the wireless network adapter management software may be configured to store channel and location information when connected to a preferred network. The wireless network adapter management software may be configured to transmit specific commands to the wireless network adapter driver to connect to a specific preferred network. Likewise, the wireless network adapter driver may provide specific functionality to receive a list of channels or network ranges (from the operating system or wireless network adapter management software) to perform a reduced network scan only on specific channels or bands.

Although several of the described embodiments were included with reference to the use of Wi-Fi and IEEE 802.11 standard wireless network implementations, it will be understood that the present techniques may be implemented in connection with a variety of other wireless network standards, such as Wireless Wide Area Network (WWAN) protocols and devices. Therefore, the term "wireless network" as used herein is not necessarily intended to be limiting to the use of a Wi-Fi or WLAN network, but may also include a variety of wireless protocols and devices communicating via such wireless protocols.

As described herein, various methods or techniques, or certain aspects or portions thereof, may take the form of program code (i.e., instructions) embodied in tangible media, such as flash memory, CD/DVD-ROMs, hard drives, portable storage devices, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 6:
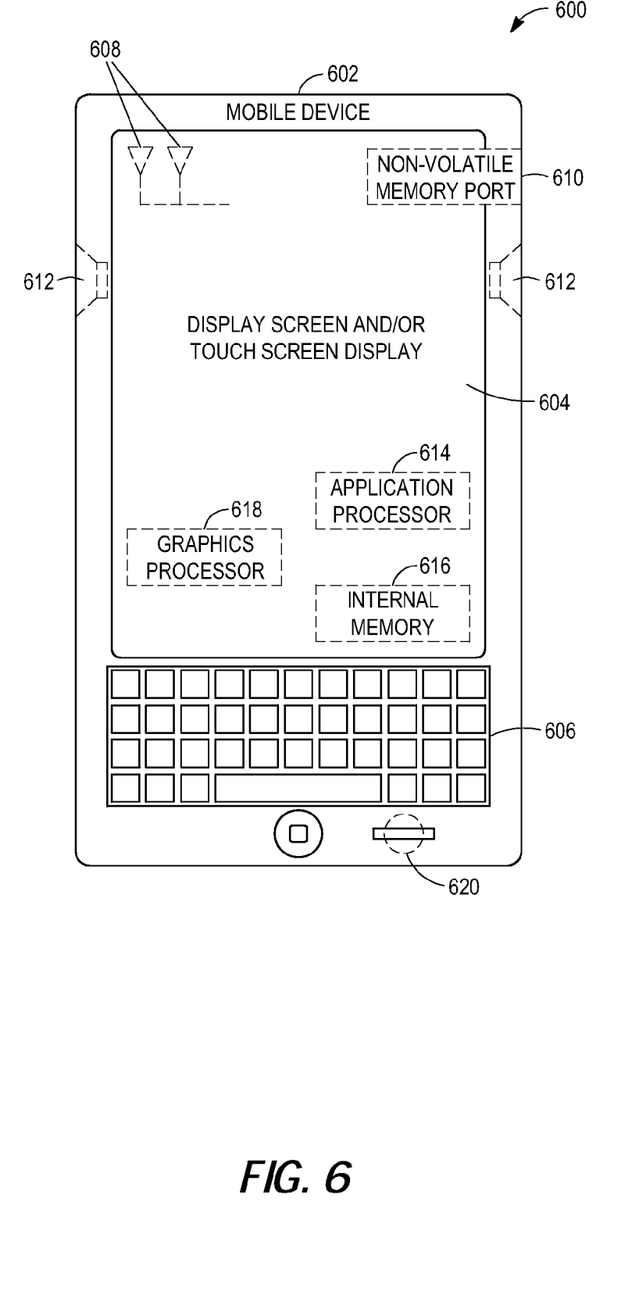
FIG. 6 illustrates an example mobile device on which the configurations and techniques described herein may be deployed.

FIG. 6 provides an example illustration of a mobile device 600, such as a user equipment (UE), a mobile station (MS), a mobile wireless device, a mobile communication device, a tablet, a handset, or other type of mobile wireless device. The mobile device 600 may include one or more antennas 608 configured to communicate with a base station (BS), an evolved Node B (eNB), or other type of wireless wide area network (WWAN) access point. The mobile device may be configured to communicate using at least one wireless communication standard including 3GPP LTE, WiMAX, High Speed Packet Access (HSPA), Bluetooth, and Wi-Fi. The mobile device 600 may communicate using separate antennas for each wireless communication standard or shared antennas for multiple wireless communication standards. The mobile device 600 may communicate in a wireless local area network (WLAN), a wireless personal area network (WPAN), and/or a wireless wide area network (WWAN).

FIG. 6 also provides an illustration of a microphone 620 and one or more speakers 612 that may be used for audio input and output from the mobile device 600. The display screen 604 may be a liquid crystal display (LCD) screen, or other type of display screen such as an organic light emitting diode (OLED) display. The display screen 604 may be configured as a touch screen. The touch screen may use capacitive, resistive, or another type of touch screen technology. An application processor 614 and a graphics processor 618 may be coupled to internal memory 616 to provide processing and display capabilities. A non-volatile memory port 610 may also be used to provide data input/output options to a user. The non-volatile memory port 610 may also be used to expand the memory capabilities of the mobile device 600. A keyboard 606 may be integrated with the mobile device 600 or wirelessly connected to the mobile device 600 to provide additional user input. A virtual keyboard may also be provided using the touch screen.

Figure 7:
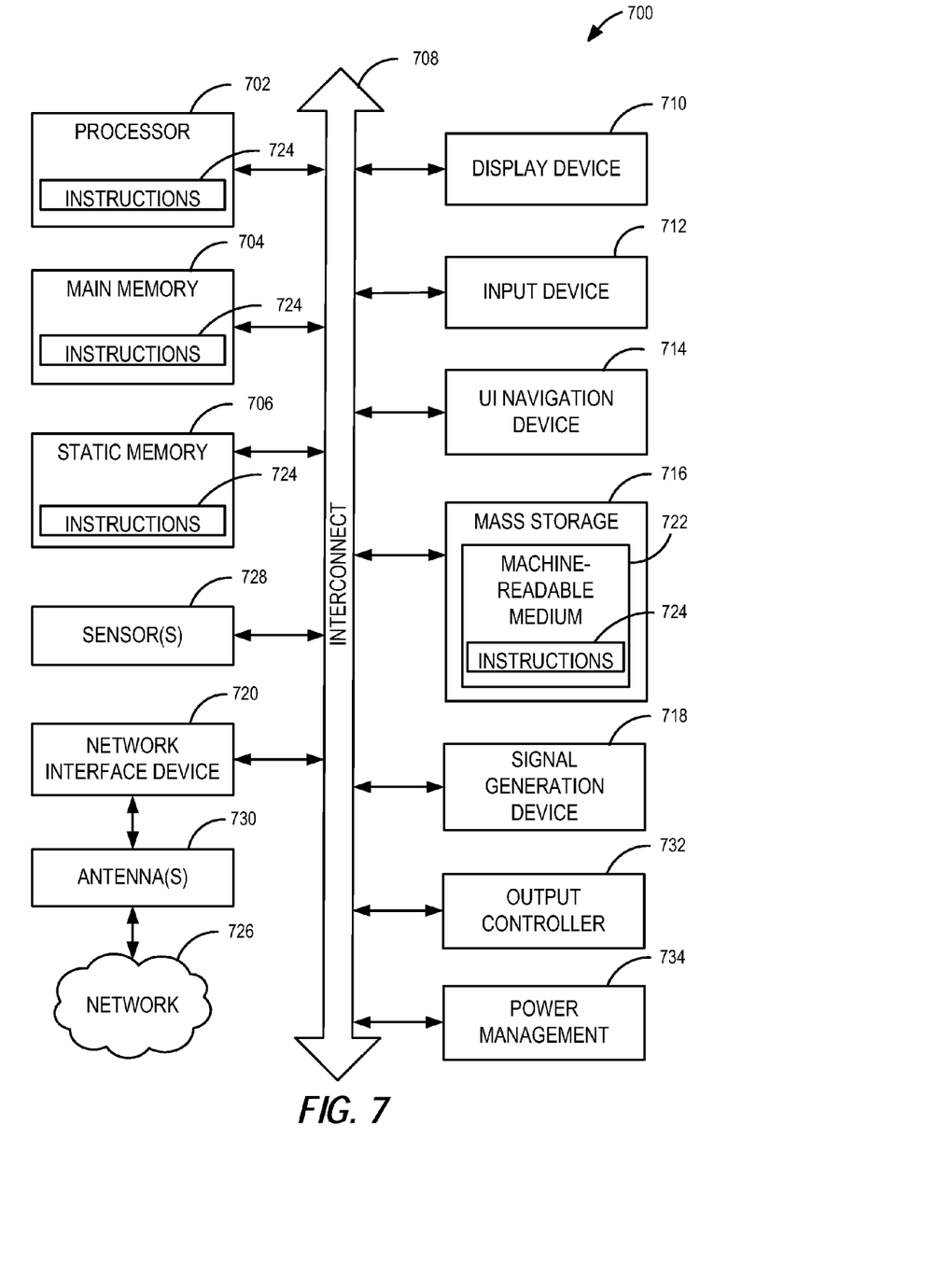
FIG. 7 illustrates an example computer system that may be used as a computing platform for the computing devices described herein.

FIG. 7 is a block diagram illustrating an example computer system machine upon which any one or more of the methodologies herein discussed may be run. Computer system 700 may be embodied as the computing device 104, mobile device 106, mobile device 600 (from FIGS. 1 and 6), or any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704 and a static memory 706, which communicate with each other via an interconnect 708 (e.g., a link, a bus, etc.). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are a touch screen display. The computer system 700 may additionally include a storage device 716 (e.g., a drive unit), a signal generation device 718 (e.g., a speaker), an output controller 732, a power management controller 734, and a network interface device 720 (which may include or operably communicate with one or more antennas 730, transceivers, or other wireless communications hardware), and one or more sensors 728, such as a GPS sensor, compass, location sensor, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes a computing device, including: processing circuitry to maintain channel information for wireless channels used by one or more preferred wireless networks; and a wireless network adapter to perform a reduced wireless network scan, wherein the reduced wireless network scan uses the channel information to scan only the wireless channels used by the preferred wireless networks.

In Example 2, the subject matter of Example 1 may optionally include processing circuitry to: identify an available preferred wireless network from a listing of the preferred wireless networks, using results of the reduced wireless network scan; and establish a connection to the identified preferred wireless network.

In Example 3, the subject matter of one or any combination of Examples 1-2 may optionally include operations to establish the connection to the identified preferred wireless network include: associating with the identified preferred wireless network; authenticating with the identified preferred wireless network; and receiving network connectivity information including an Internet Protocol (IP) address from the identified preferred wireless network.

In Example 4, the subject matter of one or any combination of Examples 1-3 may optionally include processing circuitry to: perform a scan of additional wireless channels, using the wireless network adapter, in response to none of the preferred wireless networks being identified from the reduced wireless network scan; and identify available wireless networks from results of the reduced wireless network scan and results of the scan of additional wireless channels.

In Example 5, the subject matter of one or any combination of Examples 1-4 may optionally include processing circuitry to: determine the channel information for the wireless channels used by the preferred wireless networks from one or more wireless network scans; and store the channel information for the wireless channels used by the preferred wireless networks in a data store.

In Example 6, the subject matter of one or any combination of Examples 1-5 may optionally include the reduced wireless network scan disregarding channel information from certain of the preferred wireless networks based on location, computing device usage, or network characteristics, to scan only the wireless channels used by other preferred wireless networks.

In Example 7, the subject matter of one or any combination of Examples 1-6 may optionally include a power management component, the power management component configured to provide a command to perform the reduced wireless network scan in response to the computing device or the wireless network adapter resuming from a standby or powered-off state.

In Example 8, the subject matter of one or any combination of Examples 1-7 may optionally include the processing circuitry being configured to facilitate operations of the reduced wireless network scan through execution of one or more software modules provided by one or more of: an operating system, a wireless network adapter management component, or a wireless network adapter driver.

In Example 9, the subject matter of one or any combination of Examples 1-8 may optionally include the wireless network adapter being configured to provide communications with wireless fidelity (Wi-Fi) networks operating according to a standard from the IEEE 802.11 standards family, and wherein the computing device is a mobile computing device selected from the group consisting of a smartphone, a personal digital assistant (PDA), a notebook computer, a netbook computer, and a tablet.

Example 10 may include, or may optionally be combined with the subject matter of one or any combination of Examples 1-9 to include a method (e.g., a process, technique, or procedural implementation) performed in a computing device for conducting a reduced scan of wireless networks, comprising: accessing wireless channel information maintained for one or more preferred wireless networks; identifying, from the wireless channel information, one or more wireless channels providing the preferred wireless networks; and performing a reduced wireless network scan to identify available wireless networks of the preferred wireless networks, by scanning only the identified wireless channels providing the preferred wireless networks.

In Example 11, the subject matter of Example 10 may optionally include identifying a most preferred wireless network from among multiple of the available wireless networks of the preferred wireless networks, using results of the reduced wireless network scan; and establishing a connection to the identified most preferred wireless network.

In Example 12, the subject matter of one or any combination of Examples 10-11 may optionally include establishing a connection with an identified available wireless network provided on the wireless channels, including associating with the identified available wireless network, and authenticating with the identified available wireless network.

In Example 13, the subject matter of one or any combination of Examples 10-12 may optionally include performing a scan of additional wireless channels in response to none of the preferred wireless networks being identified from the reduced wireless network scan; and identifying available wireless networks from results of the reduced wireless network scan and results of the scan of the additional wireless channels.

In Example 14, the subject matter of one or any combination of Examples 10-13 may optionally include performing the reduced wireless network scan to identify available wireless networks by refraining from scanning wireless channels that are not providing the preferred wireless networks, wherein the method is performed in response to determining a previously connected wireless network is not available for reconnection.

In Example 15, the subject matter of one or any combination of Examples 10-14 may optionally include establishing a profile for each of the preferred wireless networks, the profile providing the wireless channel information for a respective preferred wireless network; and storing profiles and the wireless channel information for the preferred wireless networks in a data store.

In Example 16, the subject matter of one or any combination of Examples 10-15 may optionally include the method being performed in response to the computing device resuming from a low-power or powered-off state.

In Example 17, the subject matter of one or any combination of Examples 10-16 may optionally include disregarding wireless channel information from certain of the preferred wireless networks based on location, wireless network usage, or network characteristics, in connection with determining the wireless channels, to result in a scan of wireless channels used by other preferred wireless networks.

In Example 18, the subject matter of one or any combination of Examples 10-17 may optionally include accessing location information for the preferred wireless networks; wherein performance of the reduced wireless network scan on the wireless channels factors the location information and a location of the reduced wireless network scan to disregard or update wireless channel information from certain of the preferred wireless networks.

In Example 19, the subject matter of one or any combination of Examples 10-18 may optionally include the wireless network being a wireless fidelity (Wi-Fi) network operating according to a standard from the IEEE 802.11 standards family, and wherein the computing device is a mobile computing device selected from the group consisting of a smartphone, a personal digital assistant (PDA), a notebook computer, a netbook computer, and a tablet.

Example 20 may include, or may optionally be combined with the subject matter of one or any combination of Examples 1-19 to include at least one machine readable storage medium comprising a plurality of instructions that, in response to being executed on a computing device, cause the computing device to: access wireless channel information maintained for one or more preferred wireless networks; identify, from the wireless channel information, one or more wireless channels providing the preferred wireless networks; and perform a reduced wireless network scan to identify available wireless networks of the preferred wireless networks, by scanning the identified wireless channels providing the preferred wireless networks and refraining from scanning wireless channels that are not providing the preferred wireless networks.

In Example 21, the subject matter of Example 20 may optionally include the instructions further causing the computing device to: identify multiple preferred wireless networks from the available wireless networks; select a most preferred wireless network from among the identified multiple preferred wireless networks; and establish a connection to the most preferred wireless network; wherein the most preferred wireless network is selected based on one or more predefined criterion.

In Example 22, the subject matter of one or any combination of Examples 20-21 may optionally include the instructions further causing the computing device to: establish a connection in the computing device with an identified wireless network located on the one or more channels, by associating with the identified wireless network, authenticating with the identified wireless network, receiving an Internet Protocol (IP) address from the identified wireless network, and identifying the connection for use in the computing device.

In Example 23, the subject matter of one or any combination of Examples 20-22 may optionally include the instructions further causing the computing device to: perform a scan of additional wireless channels in response to none of the preferred wireless networks being detected from the reduced wireless network scan; and identify available wireless networks detected from each of the reduced wireless network scan or the scan of the additional wireless channels.

In Example 24, the subject matter of one or any combination of Examples 20-23 may optionally include the plurality of instructions being executed in the computing device in connection with execution of one or more of an operating system, a wireless network adapter management component, or a wireless network adapter driver.

The Abstract of the Disclosure is intended to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computing device, comprising:
    processing circuitry to maintain channel information for wireless channels used by one or more preferred wireless networks;
    a wireless network adapter to perform a reduced wireless network scan, wherein the reduced wireless network scan uses the channel information to scan the wireless channels used by the preferred wireless networks and to refrain from scanning other wireless channels used by non-preferred wireless networks; and
    wherein the reduced wireless network scan disregards channel information from a subset of the preferred wireless networks based on at least one of location, computing device usage, or network characteristics, to scan the wireless channels used by preferred wireless networks not in the subset and to refrain from scanning other wireless channels used by preferred wireless networks in the subset.

2. The computing device of claim 1, further comprising processing circuitry to:
    identify an available preferred wireless network from a listing of the preferred wireless networks, using results of the reduced wireless network scan; and
    establish a connection to the identified preferred wireless network.

3. The computing device of claim 2, wherein operations to establish the connection to the identified preferred wireless network include:
    associating with the identified preferred wireless network;
    authenticating with the identified preferred wireless network; and
    receiving network connectivity information including an Internet Protocol (IP) address from the identified preferred wireless network.

4. The computing device of claim 1, further comprising processing circuitry to:
    perform a scan of additional wireless channels, using the wireless network adapter, in response to none of the preferred wireless networks being identified from the reduced wireless network scan; and
    identify available wireless networks from results of the reduced wireless network scan and results of the scan of additional wireless channels.

5. The computing device of claim 1, further comprising processing circuitry to:
    determine the channel information for the wireless channels used by the preferred wireless networks from one or more wireless network scans; and
    store the channel information for the wireless channels used by the preferred wireless networks in a data store.

6. The computing device of claim 1, wherein the processing circuitry is configured to facilitate operations of the reduced wireless network scan through execution of one or more software modules provided by one or more of: an operating system, a wireless network adapter management component, or a wireless network adapter driver.

7. The computing device of claim 1, wherein the wireless network adapter is configured to provide communications with wireless fidelity (Wi-Fi) networks operating according to a standard from the IEEE 802.11 standards family, and wherein the computing device is a mobile computing device configured for operation as: a smartphone, a personal digital assistant (PDA), a notebook computer, a netbook computer, or a tablet.

8. A computing device of comprising:
    processing circuitry to maintain channel information for wireless channels used by one or more preferred wireless networks;
    a wireless network adapter to perform a reduced wireless network scan, wherein the reduced wireless network scan uses the channel information to scan the wireless channels used by the preferred wireless networks and to refrain from scanning other wireless channels used by non-preferred wireless networks; and
    a power management component, the power management component configured to provide a command to perform the reduced wireless network scan in response to the computing device or the wireless network adapter resuming from a standby or powered-off state.

9. A method performed in a computing device for identifying wireless networks, the method comprising:
    accessing wireless channel information maintained for one or more preferred wireless networks;
    identifying, from the wireless channel information, one or more wireless channels providing the preferred wireless networks;
    performing a reduced wireless network scan to identify available wireless networks of the preferred wireless networks, by scanning the identified wireless channels providing the preferred wireless networks and refraining from scanning other wireless channels used by non-preferred wireless networks; and
    disregarding wireless channel information from a subset of the preferred wireless networks based on at least one of location, wireless network usage, or network characteristics, in connection with determining the wireless channels, to result in scanning of wireless channels used by preferred wireless networks not in the subset and to refrain from scanning other wireless channels used by preferred wireless networks in the subset.

10. The method of claim 9, further comprising:
identifying a most preferred wireless network from among multiple of the available wireless networks of the preferred wireless networks, using results of the reduced wireless network scan; and
establishing a connection to the identified most preferred wireless network.

11. The method of claim 9, further comprising:
establishing a connection with an identified available wireless network provided on the wireless channels, including associating with the identified available wireless network, and authenticating with the identified available wireless network.

12. The method of claim 9, further comprising:
performing a scan of additional wireless channels in response to none of the preferred wireless networks being identified from the reduced wireless network scan; and
identifying available wireless networks from results of the reduced wireless network scan and results of the scan of the additional wireless channels.

13. The method of claim 9, wherein performing a reduced wireless network scan to identify available wireless networks includes refraining from scanning wireless channels that are not providing the preferred wireless networks, and wherein the method is performed in response to determining a previously connected wireless network is not available for reconnection.

14. The method of claim 9, further comprising:
establishing a profile for each of the preferred wireless networks, the profile providing the wireless channel information for a respective preferred wireless network; and
storing profiles and the wireless channel information for the preferred wireless networks in a data store.

15. The method of claim 9, further comprising:
accessing location information for the preferred wireless networks;
wherein performance of the reduced wireless network scan on the wireless channels factors the location information and a location of the reduced wireless network scan to disregard or update wireless channel information from certain of the preferred wireless networks.

16. The method of claim 9, wherein the wireless network is a wireless fidelity (Wi-Fi) network operating according to a standard from the IEEE 802.11 standards family, and wherein the computing device is a mobile computing device configured for operation as: a smartphone, a personal digital assistant (PDA), a notebook computer, a netbook computer, or a tablet.

17. A method performed in a computing device for identifying wireless networks, the method comprising:
accessing wireless channel information maintained for one or more preferred wireless networks;
identifying, from the wireless channel information, one or more wireless channels providing the preferred wireless networks; and
performing a reduced wireless network scan to identify available wireless networks of the preferred wireless networks, by scanning only the identified wireless channels providing the preferred wireless networks; wherein the method is performed in response to the computing device resuming from a low-power or powered-off state.

18. At least one machine readable storage medium comprising a plurality of instructions that, in response to being executed on a computing device resuming from a low-power or powered-off state, cause the computing device to:
access wireless channel information maintained for one or more preferred wireless networks;
identify, from the wireless channel information, one or more wireless channels providing the preferred wireless networks; and
perform a reduced wireless network scan to identify available wireless networks of the preferred wireless networks, by scanning the identified wireless channels providing the preferred wireless networks and refraining from scanning wireless channels that are not providing the preferred wireless networks.

19. The machine readable storage medium of claim 18, the instructions further causing the computing device to:
identify multiple preferred wireless networks from the available wireless networks;
select a most preferred wireless network from among the identified multiple preferred wireless networks; and
establish a connection to the most preferred wireless network;
wherein the most preferred wireless network is selected based on one or more predefined criterion.

20. The machine readable storage medium of claim 18, the instructions further causing the computing device to:
establish a connection in the computing device with an identified wireless network located on the one or more channels, by associating with the identified wireless network, authenticating with the identified wireless network, receiving an Internet Protocol (IP) address from the identified wireless network, and identifying the connection for use in the computing device.

21. The machine readable storage medium of claim 18, the instructions further causing the computing device to:
perform a scan of additional wireless channels in response to none of the preferred wireless networks being detected from the reduced wireless network scan; and
identify available wireless networks detected from each of the reduced wireless network scan or the scan of the additional wireless channels.

22. The machine readable storage medium of claim 18, wherein the instructions are executed in the computing device in connection with execution of one or more of an operating system, a wireless network adapter management component, or a wireless network adapter driver.

\* \* \* \* \*